US012002405B1

(12) United States Patent
Yang et al.

(10) Patent No.: US 12,002,405 B1
(45) Date of Patent: Jun. 4, 2024

(54) DISPLAY PANEL AND DISPLAY DEVICE

(71) Applicant: TCL CHINA STAR OPTOELECTRONICS TECHNOLOGY CO., LTD., Guangdong (CN)

(72) Inventors: Liu Yang, Guangdong (CN); Mengmeng Hu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/306,868

(22) Filed: Apr. 25, 2023

(30) Foreign Application Priority Data

Dec. 30, 2022 (CN) ........................ 202211738367.4

(51) Int. Cl.
*G09G 3/20* (2006.01)

(52) U.S. Cl.
CPC ... *G09G 3/2092* (2013.01); *G09G 2300/0426* (2013.01); *G09G 2310/0278* (2013.01)

(58) Field of Classification Search
CPC ... G09G 2300/0426; G09G 2300/0842; G09G 2300/0819; G09G 2300/0465; G09G 2300/043; G09G 2300/0452; G09G 3/20; G09G 3/3266; G09G 3/3614; G09G 3/3655; G09G 2320/0233; G09G 2320/043; G09G 2320/0209; G09G 2320/0219; G09G 2320/0247; G09G 2320/0223
See application file for complete search history.

(56) References Cited

U.S. PATENT DOCUMENTS

2002/0024493 A1* 2/2002 Ozawa ................. G09G 3/3233 345/92
2003/0137255 A1* 7/2003 Park ..................... G09G 3/3233 315/169.3
2008/0309653 A1* 12/2008 Takahashi ............ G09G 3/3233 345/211
2014/0368417 A1* 12/2014 Yamazaki ......... H01L 21/02266 345/92

* cited by examiner

*Primary Examiner* — Dong Hui Liang
(74) *Attorney, Agent, or Firm* — PV IP PC; Zhigang Ma; Wei Te Chung

(57) ABSTRACT

A display panel and a display device are provided. The display panel includes a plurality of data lines, a plurality of first scan line; and a plurality of sub-pixels, wherein each of the sub-pixels includes a pixel driving circuit and a pixel electrode electrically connected to the pixel driving circuit, the pixel driving circuit is electrically connected to a corresponding one of the data lines and a corresponding one of the first scan lines. The display panel further includes a plurality of plates. At least one of the plates is disposed between the corresponding data line electrically connected to the pixel driving circuit and an adjacent data line, and is electrically connected to the adjacent data line. The at least one of the plates and the pixel electrode define a first capacitance.

20 Claims, 3 Drawing Sheets

DISPLAY PANEL AND DISPLAY DEVICE

CROSS-REFERENCE TO RELATED APPLICATIONS

This application claims priority to Chinese Patent Application No. 202211738367.4, filed on Dec. 30, 2022, entitled "DISPLAY PANEL AND DISPLAY DEVICE", which is incorporated herein by reference in its entirety.

TECHNICAL FIELD

The present application relates to the field of display technologies, and more particularly, to a display panel and a display device.

BACKGROUND

Development of liquid crystal panels makes width of a bezel more and more close to development limit, and a narrow bezel is a great trend in the future market. In design, a narrow bezel is achieved by placing a gate driver on array (GOA) from left and right sides of the liquid crystal panel to the source driving side. However, this design has more longitudinal traces, which generate large parasitic capacitance with the pixel electrodes. Currently, in order to balance the parasitic capacitance on a side of a sub-pixel, a dummy data line is designed on another side of the sub-pixel. As such, the pixel electrode and the dummy data line define a balance capacitance to balance the parasitic capacitance on two sides of the sub-pixel. However, the dummy data line may reduce the aperture rate.

SUMMARY

A display panel and a display device are provided according to the present application.

An embodiment of the present application provides a display panel including a display area, wherein the display area includes a plurality of sub-pixel areas, each of the sub-pixel areas includes an opening area and a non-opening area, the non-opening area includes a main non-opening area on a side of the opening area. The display panel includes a plurality of data lines extending in a first direction, a plurality of first scan lines extending in a second direction intersecting with the first direction; and a plurality of sub-pixels, wherein each of the sub-pixels is disposed in a corresponding sub-pixel area and includes a pixel driving circuit and a pixel electrode electrically connected to the pixel driving circuit, the pixel driving circuit is disposed in the main non-opening area and is electrically connected to a corresponding one of the data lines and a corresponding one of the first scan lines, the pixel electrode is at least partially disposed in the opening area. The display panel further includes a plurality of plates, at least one of the plates is disposed in the main non-opening area of the corresponding sub-pixel area, and between the corresponding data line electrically connected to the pixel driving circuit in the main non-opening area and an adjacent data line; and the at least one of the plates is electrically connected to the adjacent data line; wherein the at least one of the plates and the pixel electrode in the opening area of the corresponding sub-pixel area define a first capacitance.

In some embodiments, the pixel electrode includes an extension portion in the main non-opening area, and the at least one of the plates in the main non-opening area overlaps with the extension portion at a top view.

In some embodiments, the pixel electrode includes a trunk electrode and a plurality of branch electrodes connected to the trunk electrode, and at least one of the branch electrodes includes the extension portion.

In some embodiments, a width of the at least one of the plates is greater than a width of the corresponding data line.

In some embodiments, the display panel further includes a plurality of second scan lines extending in the first direction, wherein each of the second scan lines is electrically connected to the corresponding first scan line and is disposed at a different layer from the corresponding first scan line.

In some embodiments, each of the plates is electrically connected to the adjacent data line by a bridge portion across the corresponding second scan line.

In some embodiments, the display panel includes a substrate, a first conductive layer on the substrate, a gate insulating layer on the first conductive layer, an active layer on the gate insulating layer, a first insulating layer on the active layer, and a second conductive layer on the first insulating layer; wherein the first conductive layer includes the plurality of first scan lines and a plurality of the bridge portions, the second conductive layer includes the plurality of second scan lines, the plurality of data lines, and the plurality of plates; wherein each of the bridge portions is electrically connected between a corresponding plate and the adjacent data line through vias in the first insulating layer and the gate insulating layer.

In some embodiments, the first conductive layer further includes a gate portion of the pixel driving circuit, the gate portion extends from a side of the corresponding first scan line, and an area of the gate portion is less than an area of the corresponding plate.

In some embodiments, the corresponding data line and the pixel electrode are overlapped at a top view and define a second capacitance.

An embodiment of the present application further provides a display device including the display panel as described above.

According to the display panel and the display device according to the embodiment of the present application, by adding a plate electrically connected to an adjacent data line in a main non-opening area, a first capacitance is defined between the plate and the pixel electrode, so that the parasitic capacitance between the data line and the pixel electrode can be balanced while the aperture rate is ensured.

BRIEF DESCRIPTION OF THE DRAWINGS

In order that the technical solution in the embodiments of the present disclosure may be explained more clearly, references will now be made briefly to the accompanying drawings required for the description of the embodiments. It will be apparent that the accompanying drawings in the following description are merely some of the embodiments of the present disclosure, and other drawings may be made to those skilled in the art without involving any inventive effort.

DETAILED DESCRIPTION OF THE EMBODIMENTS

Figure 1:
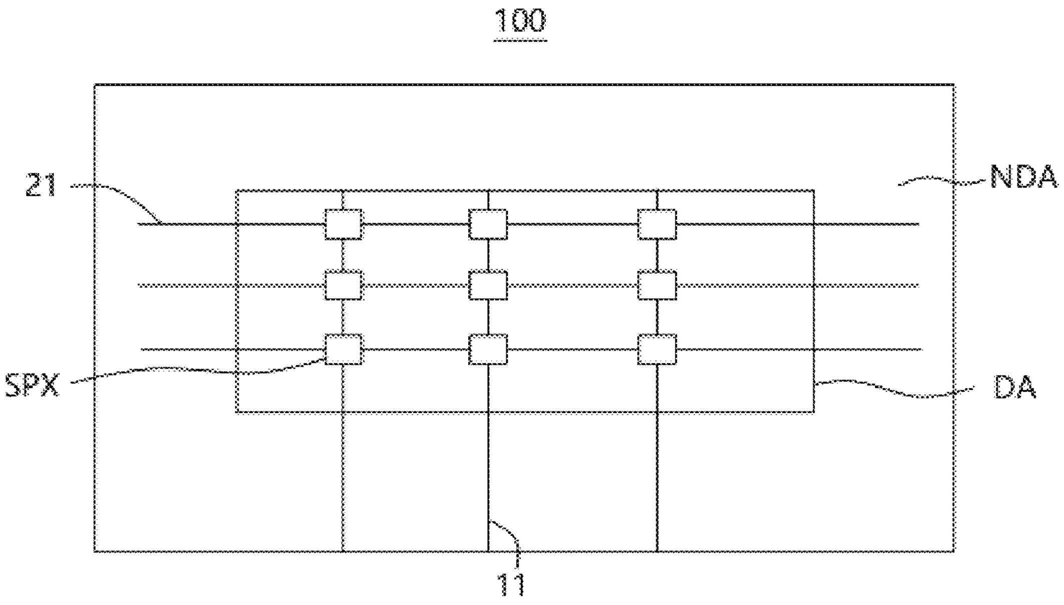
FIG. 1 is a schematic plan diagram of a display panel according to an embodiment of the present application.

The technical solutions in the embodiments of the present disclosure will be clearly and completely described in connection with the accompanying drawings in the embodiments of the present disclosure. It will be apparent that the described embodiments are merely a part of the embodiments of the present disclosure, rather than all the embodiments. Based on the embodiments in the present disclosure, all other embodiments obtained by a person skilled in the art without any inventive effort are within the scope of the present disclosure.

In the description of this disclosure, it should be understood that the azimuth or positional relationship indicated by the terms "center", "length", "width", "up", "down", "front", "back", "left", "right", "inside", "outside", and the like, is based on the azimuth or positional relationship shown in the drawings, merely to facilitate and simplify the description of this disclosure, and not to indicate or imply that the indicated device or element must have a particular azimuth, be constructed and operated in a particular azimuth, and therefore is not to be construed as limiting the disclosure. Furthermore, the terms "first" and "second" are used for descriptive purposes only and are not to be construed as indicating or implying relative importance or implying the number of indicated technical features. Thus, features defined as "first", "second" may expressly or implicitly include one or more of said features. In the description of this application, "plurality" means two or more, unless otherwise expressly and specifically defined.

In the description of the present disclosure, unless expressly defined and defined otherwise, terms such as "connected with", "connected to", "mounted", "fixed" and the like are to be understood in a broad sense, for example, may be fixedly connected, detachably connected, or as a whole; may be mechanically connected or electrically connected; may be directly connected, indirectly connected through an intermediate medium, connected inside the two elements or interacted between the two elements. It will be appreciated by those of ordinary skill in the art that the foregoing may be understood as a specific meaning within the present application, depending on the specific circumstances.

As shown in FIG. 1, an embodiment of the present application provides a display panel 100, which may be a liquid crystal display (LCD) panel.

The display panel 100 includes a display area DA and a non-display area NDA.

The display area DA may be an area for disposing the sub-pixels SPX to display images.

The non-display area NDA may be an area for disposing a driving unit to provide a driving signal to a pixel driving circuit of a sub-pixel SPX and disposing some lines to connect the driving unit, wherein the driving unit may be a gate driving circuit and the line may be a power supply line. The sub-pixel SPX may not be provided in the non-display area NDA. The non-display area NDA may be provided on at least one side of the display area DA. The non-display area NDA may at least partially surround the periphery of the display area DA.

Figure 2:
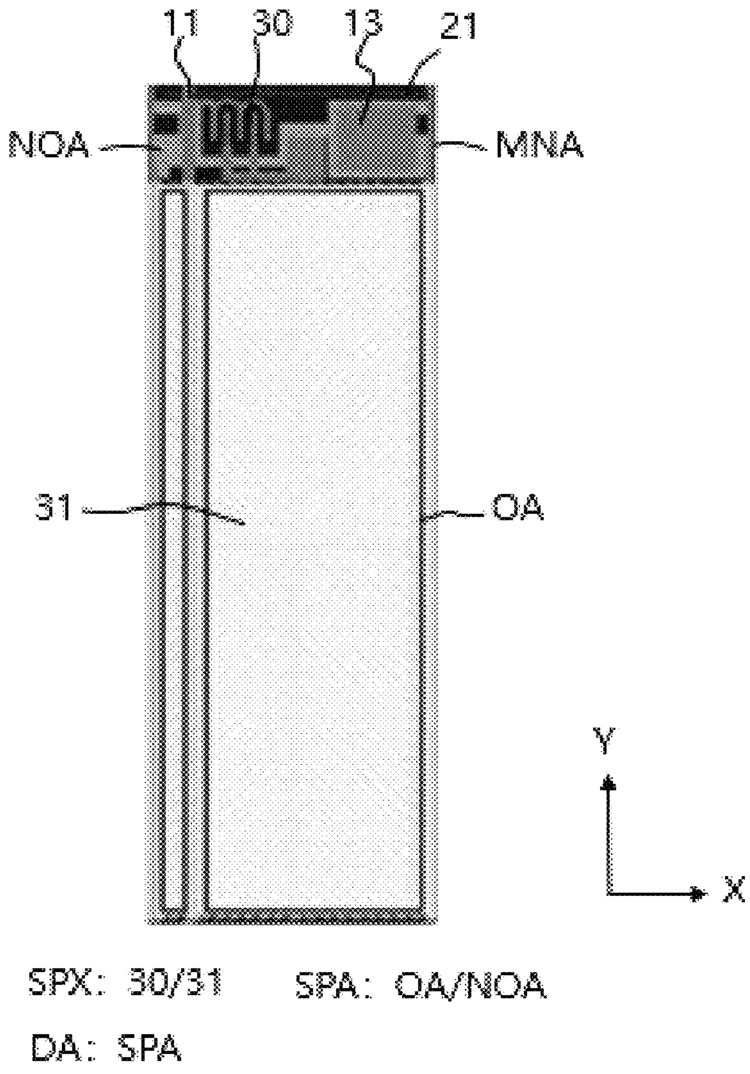
FIG. 2 is a schematic structural diagram of a sub-pixel of a display panel according to an embodiment of the present application.

Referring to FIG. 2, the display area DA includes a plurality of sub-pixel areas SPA. Each of the sub-pixel areas SPA includes an opening area OA and a non-opening area NOA, wherein the non-opening area NOA includes a main non-opening area MNA on a side of the opening area OA.

Figure 3:
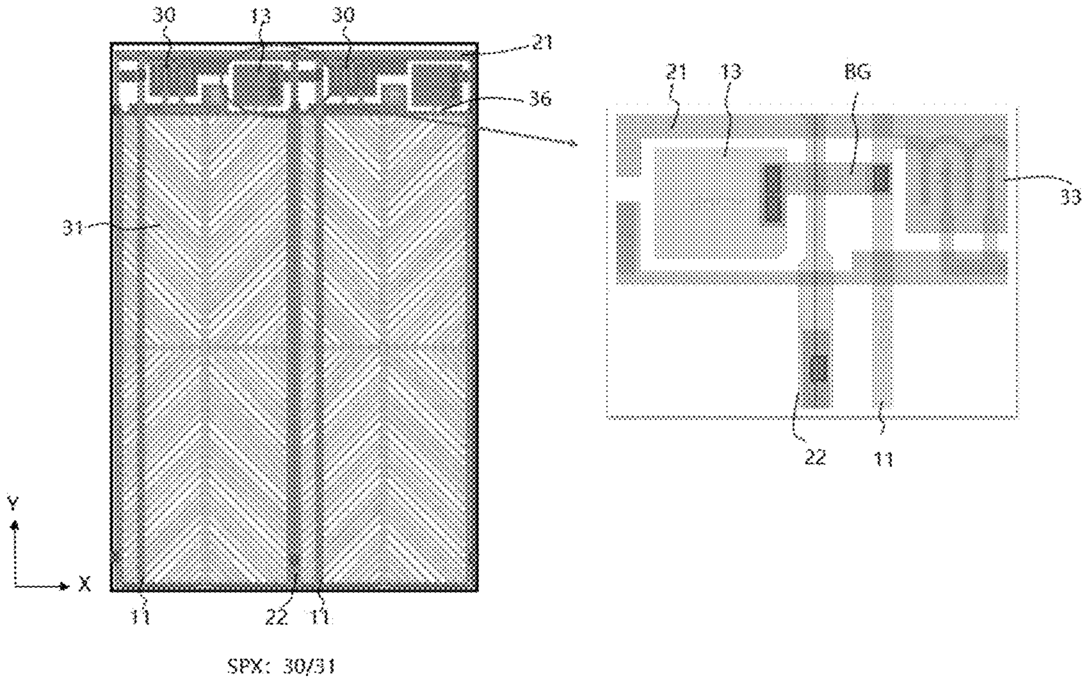
FIG. 3 is a schematic structural diagram of adjacent sub-pixels of a display panel according to an embodiment of the present application.

Referring to FIG. 2 and FIG. 3, the display panel 100 includes a plurality of data lines 11, a plurality of first scan lines 21, a plurality of second scan lines 22, a plurality of sub-pixels SPX, and a plurality of plates 13.

The plurality of the data lines 11 are arranged substantially parallel to each other and extend in the first direction Y. Each of the data lines 11 passes through a corresponding one of the opening areas OA for transmitting a data voltage of a source driver to a corresponding one of the sub-pixels SPX. The data line 11 overlaps with the corresponding pixel electrode 31 at a top view to define a parasitic capacitance (i.e., a second capacitance). It should be appreciated that when the data line 11 is disposed offset from the pixel electrode 31, a parasitic capacitance (i.e., a second capacitance) at lateral direction may also be defined.

A plurality of the first scan lines 21 are arranged substantially parallel to each other and extend in the second direction X intersecting with the first direction Y. Each of the first scan lines 21 is in a main non-opening area MNA of the corresponding sub-pixel area SPA for transmitting a scan signal to the corresponding sub-pixel SPX. Exemplarily, the first direction Y is perpendicular to the second direction X.

A plurality of second scan lines 22 are disposed substantially parallel to each other and extend in the first direction Y. Each of the second scan lines 22 is disposed between two adjacent sub-pixel areas SPA, and is electrically connected between the corresponding first scan line 21 and the gate driver to transmit a scan signal from the gate driver to the corresponding first scan line 21. Each of the second scan lines 22 is disposed in a different layer from the corresponding first scan line 21. In this way, the gate driver and the source driver may be provided on the same side of the display panel 100, for example, the lower frame of the display panel 100. Thus, the width of the side frame of the display panel 100 can be reduced.

Each of the sub-pixels SPX is disposed in a corresponding sub-pixel area SPA, and the sub-pixel SPX includes a pixel driving circuit 30, and a pixel electrode 31 electrically connected to the pixel driving circuit 30.

The pixel driving circuit 30 is disposed in the main non-opening area MNA, and is electrically connected to the corresponding data line 11 and the corresponding first scan line 21. Each of the pixel driving circuits 30 includes a plurality of thin film transistors for driving the corresponding pixel electrodes 31. The gate portion 33 of the pixel driving circuit 30 extends from a side of the corresponding first scan line 21 and is substantially rectangular. Exemplarily, the gate portion 33 is used as the gates for at least two of the thin film transistors.

The pixel electrode 31 is disposed at least partially within the opening area OA. Specifically, the pixel electrode 31 includes a trunk electrode, and a plurality of branch electrodes connected to the trunk electrode. The trunk electrode is generally cross-shaped. At least one of the branch electrodes defines an included angle with the trunk electrode, and at least one of the branch electrodes further includes a main portion and an extension portion 36, wherein the extension portion 36 is connected to the main portion and disposed in the corresponding main non-opening area MNA. An area of the extension portion 36 is less than an area of the main portion. In this way, the parasitic capacitance between the plate 13 and the pixel electrode 31 can be controlled.

At least one of the plates 13 is disposed in the main non-opening area MNA of the corresponding sub-pixel area SPA, between a corresponding data line 11 electrically connected to the pixel driving circuit 30 in the main non-opening area MNA and an adjacent data line 11 (that is, the least one of the plates 13 is disposed between two adjacent data lines 11), and is electrically connected to an adjacent data line 11.

The plate 13 overlaps the extension portion 36 of the pixel electrode 31 in the opening area OA of the corresponding sub-pixel area SPA to define a first capacitance. It should be appreciated that the plate 13 may also be offset from the pixel electrode 31 to define a lateral first capacitance. Thus, by adding the plate 13 electrically connected with the adjacent data line 11 to the main opening area OA, the plate 13 and the pixel electrode 31 define a first capacitance, so that the parasitic capacitance (i.e., a second capacitance) between the data line 11 and the pixel electrode 31 can be balanced while the aperture rate is ensured.

Since a length of the plate 13 is less than a length of the corresponding data line 11, in order to match the first capacitance with the second capacitance, the plate 13 may be designed to be substantially rectangular, and a width of the plate 13 may be designed to be greater than a width of the corresponding data line 11. In practical design, in order to ensure the capacitance value of the first capacitance, the area of the plate 13 may be designed to be greater than the area of the corresponding gate portion 33.

Figure 4:
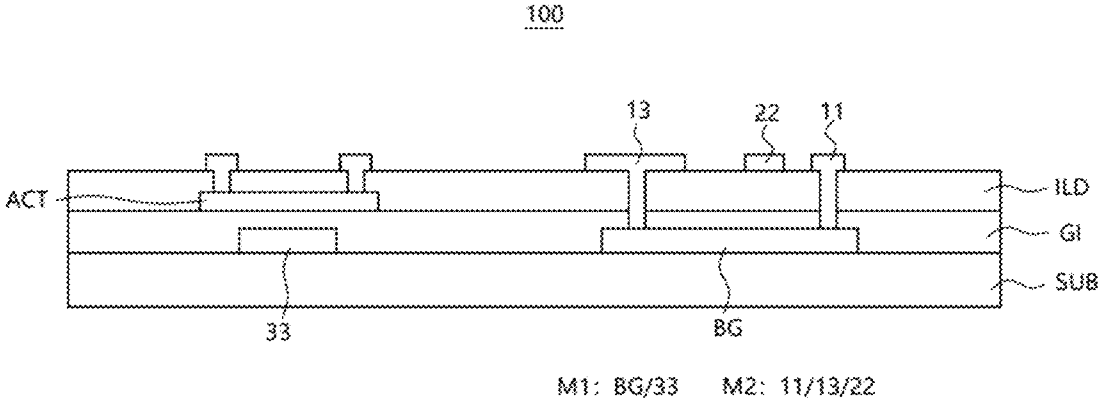
FIG. 4 is a schematic structural diagram of a layer structure of a display panel according to an embodiment of the present application.

Referring to FIG. 4, the display panel 100 includes a substrate SUB, a first conductive layer M1 on the substrate SUB, a gate insulating layer GI on the first conductive layer M1, an active layer ACT on the gate insulating layer GI, a first insulating layer ILD on the active layer ACT, and a second conductive layer M2 on the first insulating layer ILD.

The substrate SUB may include a monolayer insulating material such as glass, quartz, and a polymer resin, or a multilayer insulating material such as a double-layer polymer resin. The substrate SUB may be a rigid substrate SUB or a flexible substrate SUB. The substrate SUB carries film layers disposed thereon.

The first conductive layer M1 includes a plurality of the first scan lines 21 (not shown in FIG. 4), a plurality of bridge portions BG, and a gate portion 33 of each of the pixel driving circuits 30. The first conductive layer M1 may be made of a low resistance material. The first conductive layer M1 may include, but is not limited to, one or more metals selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

The gate insulating layer GI may function as a gate insulating film that insulates the active layer ACT from the gate portion 33. The gate insulating layer GI may include a silicon compound, a metal oxide, or the like. For example, the gate insulating layer GI may include silicon oxide, silicon nitride, silicon oxynitride, aluminum oxide, tantalum oxide, hafnium oxide, zirconium oxide, titanium oxide, and the like. These materials may be used alone or in combination with one another.

The active layer ACT may include a silicon-containing semiconductor material such as amorphous silicon, polysilicon, or an oxide semiconductor material. At this time, the oxide semiconductor material may include an oxide based on titanium (Ti), hafnium (Hf), zirconium (Zr), aluminum (Al), tantalum (Ta), germanium (Ge), zinc (Zn), gallium (Ga), tin (Sn), or indium (In), or composite oxides based on any one above.

The first insulating layer ILD is arranged on the active layer ACT. The first insulating layer ILD may include a silicon compound, a metal oxide, or the like. For example, the second insulating layer may include silicon oxide, silicon nitride, silicon oxynitride, aluminum oxide, tantalum oxide, hafnium oxide, zirconium oxide, titanium oxide, and the like. These materials may be used alone or in combination with one another.

The second conductive layer M2 includes a plurality of the second scan lines 22, a plurality of the data lines 11, and a plurality of plates 13. The second conductive layer M2 may include one or more metals selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), copper (Cu). The second conductive layer M2 may be a monolayer film or a multilayer film. For example, the second conductive layer M2 may be formed as a laminated structure of Ti/Al/Ti, Mo/Al/Mo, Mo/AlGe/Mo, Ti/Cu, or the like.

Each of the bridge portions BG is electrically connected between the corresponding plate 13 and the adjacent data line 11 through vias in the first insulating layer ILD and the gate insulating layer GI, so that the plate 13 is electrically connected to the adjacent data line 11 through the bridge portion BG across the corresponding second scanning line 22.

The following table is a comparison on the characteristics between the display panel of the related art and the display panel of the embodiment of the present application. It can be seen that the display panel of the present application can achieve an approximate balance of the parasitic capacitances on the left and right sides of the sub-pixel SPX, and the capacitance values of the other pixels do not differ significantly. Moreover, the aperture rate of the display panel of the present application is increased by 6%.

| Item | Pixel A | Pixel B |
|---|---|---|
| Cpd_Left/fF | 44.72 | 44.59 |
| Cpd_Right/fF | 44.66 | 44.53 |
| Ctotal/fF | 1486.86 | 1550.70 |
| Cpd/Ctotal | 0.03 | 0.029 |
| Cv-gate/fF | 296152 | 288023 |
| Cdata/fF | 549296 | 5133814 |
| AR | 68.42% | 72.45% |

An embodiment of the present application further provides a display device including the display panel as described above. The display device may be a fixed terminal, such as a television, a desktop computer; may be a mobile terminal, such as a notebook computer, a smartphone; or may be a wearable device, such as a VR, an AR, or a smart watch.

In the above-mentioned embodiments, the description of each embodiment has its own emphasis, and parts not described in detail in a certain embodiment may be referred to the related description of other embodiments.

The present application has been described in detail with reference to a display panel according to an embodiment of the present application. The specific embodiments are used to illustrate the principles and embodiments of the present application. The description of the above embodiment is merely intended to help understand the technical solution and the core idea of the present application. It will be appreciated by those of ordinary skill in the art that modifications or equivalents may be made to the embodiments.

These modifications or equivalents do not depart s from the scope of the embodiments of the present application.

What is claimed is:

1. A display panel, comprising a display area; wherein the display area comprises a plurality of sub-pixel areas, each of the sub-pixel areas comprises an opening area and a non-opening area, the non-opening area comprises a main non-opening area on a side of the opening area;

wherein the display panel comprises:

a plurality of data lines extending in a first direction, a plurality of first scan lines extending in a second direction intersecting with the first direction; and a plurality of sub-pixels, wherein each of the sub-pixels is disposed in a corresponding sub-pixel area and includes a pixel driving circuit and a pixel electrode electrically connected to the pixel driving circuit, the pixel driving circuit is disposed in the main non-opening area and is electrically connected to a corresponding one of the data lines and a corresponding one of the first scan lines, the pixel electrode is at least partially disposed in the opening area;

wherein the display panel further comprises a plurality of plates, at least one of the plates is disposed in the main non-opening area of the corresponding sub-pixel area, and between the corresponding data line electrically connected to the pixel driving circuit in the main non-opening area and an adjacent data line; and the at least one of the plates is electrically connected to the adjacent data line; wherein the at least one of the plates and the pixel electrode in the opening area of the corresponding sub-pixel area define a first capacitance;

wherein the pixel electrode comprises an extension portion in the main non-opening area, and the at least one of the plates in the main non-opening area overlaps with the extension portion at a top view.

2. A display device, comprising the display panel of claim 1.

3. The display device of claim 2, wherein the display panel further comprises a plurality of second scan lines extending in the first direction, wherein each of the second scan lines is electrically connected to the corresponding first scan line and is disposed at a different layer from the corresponding first scan line.

4. The display device of claim 3, wherein each of the plates is electrically connected to the adjacent data line by a bridge portion across the corresponding second scan line.

5. The display device of claim 4, wherein the display panel comprises a substrate, a first conductive layer on the substrate, a gate insulating layer on the first conductive layer, an active layer on the gate insulating layer, a first insulating layer on the active layer, and a second conductive layer on the first insulating layer; wherein the first conductive layer comprises the plurality of first scan lines and a plurality of the bridge portions, the second conductive layer comprises the plurality of second scan lines, the plurality of data lines, and the plurality of plates; wherein each of the bridge portions is electrically connected between a corresponding plate and the adjacent data line through vias in the first insulating layer and the gate insulating layer.

6. The display device of claim 5, wherein the first conductive layer further comprises a gate portion of the pixel driving circuit, the gate portion extends from a side of the corresponding first scan line, and an area of the gate portion is less than an area of the corresponding plate.

7. The display device of claim 2, wherein the pixel electrode comprises an extension portion in the main non-opening area, and the at least one of the plates in the main non-opening area overlaps with the extension portion at a top view.

8. The display device of claim 7, wherein the pixel electrode comprises a trunk electrode and a plurality of branch electrodes connected to the trunk electrode, and at least one of the branch electrodes comprises the extension portion.

9. The display device of claim 2, wherein a width of the at least one of the plates is greater than a width of the corresponding data line.

10. The display device of claim 2, wherein the corresponding data line and the pixel electrode are overlapped at a top view and define a second capacitance.

11. The display panel of claim 1, further comprising a plurality of second scan lines extending in the first direction, wherein each of the second scan lines is electrically connected to the corresponding first scan line and is disposed at a different layer from the corresponding first scan line.

12. The display panel of claim 11, wherein each of the plates is electrically connected to the adjacent data line by a bridge portion across the corresponding second scan line.

13. The display panel of claim 12, wherein the display panel comprises a substrate, a first conductive layer on the substrate, a gate insulating layer on the first conductive layer, an active layer on the gate insulating layer, a first insulating layer on the active layer, and a second conductive layer on the first insulating layer; wherein the first conductive layer comprises the plurality of first scan lines and a plurality of the bridge portions, the second conductive layer comprises the plurality of second scan lines, the plurality of data lines, and the plurality of plates; wherein each of the bridge portions is electrically connected between a corresponding plate and the adjacent data line through vias in the first insulating layer and the gate insulating layer.

14. The display panel of claim 13, wherein the first conductive layer further comprises a gate portion of the pixel driving circuit, the gate portion extends from a side of the corresponding first scan line, and an area of the gate portion is less than an area of the corresponding plate.

15. The display panel of claim 1, wherein the pixel electrode comprises a trunk electrode and a plurality of branch electrodes connected to the trunk electrode, and at least one of the branch electrodes comprises the extension portion.

16. The display panel of claim 1, wherein a width of the at least one of the plates is greater than a width of the corresponding data line.

17. The display panel of claim 1, wherein the corresponding data line and the pixel electrode are overlapped at a top view and define a second capacitance.

18. A display panel, comprising a display area; wherein the display area comprises a plurality of sub-pixel areas, each of the sub-pixel areas comprises an opening area and a non-opening area, the non-opening area comprises a main non-opening area on a side of the opening area;

wherein the display panel comprises:

a plurality of data lines extending in a first direction, a plurality of first scan lines extending in a second direction intersecting with the first direction; and a plurality of sub-pixels, wherein each of the sub-pixels is disposed in a corresponding sub-pixel area and includes a pixel driving circuit and a pixel electrode electrically connected to the pixel driving circuit, the pixel driving circuit is disposed in the main non-opening area and is electrically connected to a corresponding one of the data lines and a corresponding one of the first scan lines, the pixel electrode is at least partially disposed in the opening area;

wherein the display panel further comprises a plurality of plates, at least one of the plates is disposed in the main non-opening area of the corresponding sub-pixel area, and between the corresponding data line electrically connected to the pixel driving circuit in the main non-opening area and an adjacent data line; and the at least one of the plates is electrically connected to the adjacent data line; wherein the at least one of the plates and the pixel electrode in the opening area of the corresponding sub-pixel area define a first capacitance;

wherein the display panel further comprises a plurality of second scan lines extending in the first direction, and each of the second scan lines is electrically connected to the corresponding first scan line and is disposed at a different layer from the corresponding first scan line.

19. The display panel of claim 18, wherein each of the plates is electrically connected to the adjacent data line by a bridge portion across the corresponding second scan line.

20. The display panel of claim 19, wherein the display panel comprises a substrate, a first conductive layer on the substrate, a gate insulating layer on the first conductive layer, an active layer on the gate insulating layer, a first insulating layer on the active layer, and a second conductive layer on the first insulating layer; wherein the first conductive layer comprises the plurality of first scan lines and a plurality of the bridge portions, the second conductive layer comprises the plurality of second scan lines, the plurality of data lines, and the plurality of plates; wherein each of the bridge portions is electrically connected between a corresponding plate and the adjacent data line through vias in the first insulating layer and the gate insulating layer.

* * * * *